United States Patent
Xu et al.

(10) Patent No.: US 9,410,817 B2
(45) Date of Patent: Aug. 9, 2016

(54) METHOD AND APPARATUS FOR PUSHING TRACK INFORMATION

(71) Applicant: Baidu Online Network Technology (Beijing) Co., Ltd., Beijing (CN)

(72) Inventors: Mingquan Xu, Beijing (CN); Dairui Cui, Beijing (CN); Zhuocong Kuang, Beijing (CN); Min Qin, Beijing (CN); Shaojian Huang, Beijing (CN); Yuyao Wang, Beijing (CN); Yue Wang, Beijing (CN); Wei Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/587,725

(22) Filed: Dec. 31, 2014

(65) Prior Publication Data

US 2016/0018233 A1     Jan. 21, 2016

(30) Foreign Application Priority Data

Jul. 18, 2014   (CN) .......................... 2014 1 0344758

(51) Int. Cl.
| | |
|---|---|
| G06Q 30/02 | (2012.01) |
| G06N 5/04 | (2006.01) |
| G01C 21/36 | (2006.01) |
| G01C 21/34 | (2006.01) |
| H04W 4/02 | (2009.01) |
| G01C 21/20 | (2006.01) |

(52) U.S. Cl.
CPC ............ *G01C 21/3617* (2013.01); *G01C 21/20* (2013.01); *G01C 21/343* (2013.01); *G01C 21/3476* (2013.01); *G01C 21/3484* (2013.01);
(Continued)

(58) Field of Classification Search
CPC ............... G06F 17/30; G06F 17/3087; G06F 17/30864; G01C 21/343; G01C 21/3611; G01C 21/00; G06Q 30/02; G06N 5/04

USPC .......... 707/769, 772; 701/521, 532, 454, 426, 701/415; 706/48
See application file for complete search history.

(56) References Cited

U.S. PATENT DOCUMENTS

| | | | |
|---|---|---|---|
| 6,553,310 B1 * | 4/2003 | Lopke | G06F 17/3087 701/454 |
| 7,546,206 B1 * | 6/2009 | Miller | G01C 21/00 701/120 |

(Continued)

FOREIGN PATENT DOCUMENTS

WO     WO 2013/045753 A1     4/2013

OTHER PUBLICATIONS

Extended European Search Report, EP Application No. 14200495.1, Jan. 7, 2016.

*Primary Examiner* — Yuri Kan
(74) *Attorney, Agent, or Firm* — Orrick, Herrington & Sutcliffe, LLP

(57) ABSTRACT

The embodiments of the present invention provide a method for pushing track information, comprising: receiving a key word sent by a client; obtaining, according to historical track information, recommended track information which matches the key word, wherein the historical track information comprises historical track information about a terminal where the client is located and historical track information about terminal(s) other than the terminal where the client is located; and pushing the recommended track information to the client. The embodiments of the present invention also provide an apparatus for pushing track information. According to the technical solutions provided in the embodiments of the present invention, the reliability of pushed track information can be ensured.

18 Claims, 1 Drawing Sheet

(52) U.S. Cl.
CPC ........ *G01C 21/3605* (2013.01); *G01C 21/3679*
(2013.01); *H04W 4/028* (2013.01)

(56) References Cited

U.S. PATENT DOCUMENTS

| | | | |
|---|---|---|---|
| 2002/0120396 A1 | 8/2002 | Boies et al. | |
| 2003/0045996 A1* | 3/2003 | Yamazaki | G06Q 30/02 |
| | | | 701/532 |
| 2006/0235606 A1* | 10/2006 | Finn | G01C 21/3611 |
| | | | 701/426 |
| 2010/0152999 A1 | 6/2010 | Singh | |
| 2011/0301832 A1 | 12/2011 | Zheng et al. | |
| 2013/0204895 A1* | 8/2013 | Liao | G06F 17/30864 |
| | | | 707/772 |
| 2015/0339575 A1* | 11/2015 | Streit | G06N 5/04 |
| | | | 706/48 |

\* cited by examiner

METHOD AND APPARATUS FOR PUSHING TRACK INFORMATION

CROSS-REFERENCE TO RELATED APPLICATIONS

The present application claims priority to Chinese Patent Application No. CN201410344758.7, filed on Jul. 18, 2014, the entire disclosure of which is incorporated herein by reference in its entirety and for all purposes.

TECHNICAL FIELD

The present invention relates to the technical field of positioning, and in particular to a method and apparatus for pushing track information.

BACKGROUND

A user may encounter many places that he/she desires to go to in life, but has no idea of how to plan a travel route. For example, as there are many desirable scenic spots when planning a trip route, a travel route needs to be planned. In another example, when going out to have a meal, watch a movie, go shopping and so on at weekends, a travel route needs to be planned.

At present, the method for planning a travel route is: according to points of interest selected by a user, and using a shortest path algorithm, planning a track. However, if only the track obtained by using the shortest path algorithm is provided to the user, the track is usually not the one that the user needs; therefore, the reliability of track information obtained using the current method for planning a travel route is relatively low.

SUMMARY

On that account, the embodiments of the present invention provide a method and apparatus for pushing track information, and can improve the reliability of the pushed track information.

The embodiments of the present invention provide a method for pushing track information, comprising:
  receiving a key word sent by a client;
  obtaining, according to historical track information, recommended track information which matches the key word, wherein the historical track information comprises historical track information about a terminal where the client is located and historical track information about terminal(s) other than the terminal where the client is located; and
  pushing the recommended track information to the client.

In the above-mentioned method, the key word comprises at least two points of interest, and obtaining, according to the historical track information, recommended track information which matches the key word comprises:
  obtaining, according to a corresponding relationship between the points of interest and the historical track information, historical track information corresponding to each of the points of interest of the at least two points of interest; and
  obtaining, according to the historical track information corresponding to each of the points of interest, historical track information simultaneously containing the at least two points of interest, and taking the historical track information simultaneously containing the at least two points of interest as the recommended track information.

In the above-mentioned method, the key word is a key word of a universal requirement type, and obtaining, according to historical track information, recommended track information which matches the key word comprises:
  obtaining, according to the key word, a track type of a requirement of a user using the client;
  obtaining, according to a corresponding relationship between the track type and the historical track information, historical track information corresponding to the track type; and
  selecting a part of the historical track information or all of the historical track information from the historical track information corresponding to the track type, to serve as the recommended track information which matches the key word.

In the above-mentioned method, the method further comprises:
  obtaining K pieces of historical track information corresponding to each of the scenario type(s) of at least one scenario type, K being an integer greater than or equal to 1;
  performing, according to at least one geographical position, classification processing on the K pieces of historical track information corresponding to each of the scenario type(s), so as to obtain P pieces of historical track information corresponding to each of the geographical positions, P being an integer which is greater than or equal to 1 and smaller than or equal to K;
  obtaining a weight value of each piece of historical track information of the P pieces of historical track information;
  obtaining, according to the weight value and a preset weight threshold, R pieces of historical track information of the P pieces of historical track information; or obtaining R pieces of historical track information with the maximum weight values of the P pieces of historical track information, R being an integer which is greater than or equal to 1 and smaller than or equal to P; and
  obtaining at least one track type according to the at least one scenario type and the at least one geographical position, and obtaining, according to the at least one track type and the R pieces of historical track information, a corresponding relationship between the track type and the historical track information; or, obtaining, according to the R pieces of historical track information, at least one point of interest, and obtaining, according to each of the points of interest and the R pieces of historical track information, a corresponding relationship between the points of interest and the historical track information.

In the above-mentioned method, the pushing of the recommended track information to the client comprises:
  acquiring weight values of the recommended track information;
  ranking, in accordance with the descending order of the weight values, the recommended track information, so as to obtain a ranking result; and
  pushing the ranking result to the client.

The embodiments of the present invention also provide an apparatus for pushing track information, comprising:
  a receiving unit for receiving a key word sent by a client;
  a first processing unit for obtaining, according to historical track information, recommended track information which matches the key word, wherein the historical track information comprises historical track information about a terminal where the client is located and historical track information about terminal(s) other than the terminal where the client is located; and
  a pushing unit for pushing the recommended track information to the client.

In the above-mentioned apparatus, the key word comprises at least two points of interest, and the first processing unit is specifically used for:

obtaining, according to a corresponding relationship between the points of interest and the historical track information, historical track information corresponding to each of the points of interest of the at least two points of interest; and obtaining, according to the historical track information corresponding to each of the points of interest, historical track information simultaneously containing the at least two points of interest, and taking the historical track information simultaneously containing the at least two points of interest as the recommended track information.

In the above-mentioned apparatus, the key word is a key word of a universal requirement type, and the first processing unit is specifically used for:

obtaining, according to the key word, a track type using a user requirement of the client;

obtaining, according to a corresponding relationship between the track type and the historical track information, historical track information corresponding to the track type; and selecting a part of the historical track information or all of the historical track information from the historical track information corresponding to the track type, to serve as the recommended track information which matches the key word.

In the above-mentioned apparatus, the apparatus further comprises:

a second processing unit for obtaining K pieces of historical track information corresponding to each of the scenario type(s) of at least one scenario type, K being an integer greater than or equal to 1; performing, according to at least one geographical position, classification processing on the K pieces of historical track information corresponding to each of the scenario type(s), so as to obtain P pieces of historical track information corresponding to each of the geographical positions, P being an integer which is greater than or equal to 1 and smaller than or equal to K; obtaining a weight value of each piece of historical track information of the P pieces of historical track information; obtaining, according to the weight value and a preset weight threshold, R pieces of historical track information of the P pieces of historical track information; or obtaining R pieces of historical track information with the maximum weight values of the P pieces of historical track information, R being an integer which is greater than or equal to 1 and smaller than or equal to P; and obtaining at least one track type according to the at least one scenario type and the at least one geographical position, and obtaining, according to the at least one track type and the R pieces of historical track information, a corresponding relationship between the track type and the historical track information; or, obtaining, according to the R pieces of historical track information, at least one point of interest, and obtaining, according to each of the points of interest and the R pieces of historical track information, a corresponding relationship between the points of interest and the historical track information.

In the above-mentioned apparatus, the pushing unit is specifically used for:

acquiring weight values of the recommended track information;

ranking, in accordance with the descending order of the weight values, the recommended track information, so as to obtain a ranking result; and pushing the ranking result to the client.

It can be seen from the foregoing technical solutions that the embodiments of the present invention have the beneficial effects as follows:

In the embodiments of the present invention, according to a key word input on a client, retrieval is performed in historical track information in a large number of terminals, so as to obtain recommended track information which matches the key word; therefore, the obtained recommended track information is real track information; compared with the track planned using the shortest path algorithm in the prior art, the recommended track information in the technical solution provided in the embodiments of the present invention can satisfy the needs of users, thus being able to improve the quality of the pushed track information, and improve the reliability of the pushed track information.

BRIEF DESCRIPTION OF THE ACCOMPANYING DRAWINGS

In order to illustrate the technical solutions of the embodiments of the present invention more clearly, the accompanying drawings which need to be used in the embodiments are briefly introduced hereinafter. Obviously, the accompanying drawings in the following description are merely some embodiments of the present invention, and those of ordinary skill in the art can also obtain other drawings from these drawings without involving any inventive effort.

DETAILED DESCRIPTION OF THE PREFERRED EMBODIMENTS

In order to better understand the technical solutions of the present invention, the embodiments of the present invention are described in detail below in conjunction with the accompanying drawings.

It should be clear that the described embodiments are only some of the embodiments of the present invention, rather than all of the embodiments. All other embodiments obtained by those of ordinary skill in the art and based on the embodiments of the present invention without making any inventive effort are within the scope of protection of the present invention.

The terms used in the embodiments of the present invention are merely for the purpose of illustrating particular embodiments, and are not intended to limit the present invention. The terms "a", "said" and "the" of the singular forms used in the embodiments and the appended claims of the present invention are also intended to include plural forms, unless otherwise clearly specified in the context.

It should be appreciated that the term "and/or" herein is merely an association relationship describing associated objects, and indicates that three relationships may exist, for example, A and/or B may indicate: the three cases where A exists alone, A and B exist simultaneously, and B exists alone. In addition, the character "/" herein generally indicates an "or" relationship between associated objects.

As used herein, the term "if" may be construed as "when" or "upon" or "in response to determining" or "in response to detecting", depending on the context. Similarly, the phrase "if it is determined" or "if (a stated condition or event) is detected" may be construed as "upon determining" or "in response to determining" or "upon detecting (the stated condition or event)" or "in response to detecting (the stated condition or event)", depending on the context.

Figure 1:
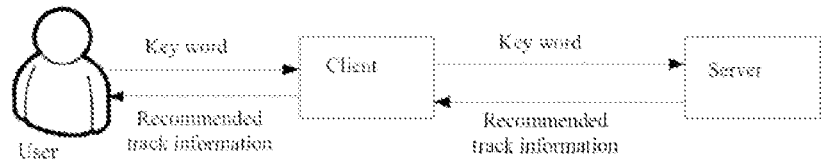
FIG. 1 is a system used in the technical solutions provided in the embodiments of the present invention.

The system used in the technical solution provided in the embodiments of the present invention is as shown in FIG. 1, which is primarily composed of a client and a server; the method and apparatus provided in the embodiments of the present invention are implemented at the server side, and are primarily used for receiving a key word sent by a client, then obtaining, according to historical track information, recommended track information which matches the key word, and finally pushing the obtained recommended track information to the client. The function of the client is not changed in the embodiments of the present invention, that is, the client sends a key word to the server, and receives the recommended track information sent by the server. It can be appreciated that the client can comprise a map client, a travel client or a navigation client. The terminal where the client is located or the other terminals can comprise a personal computer (PC), a notebook computer, a mobile phone or a tablet computer.

A method for pushing track information is provided in the embodiments of the present invention. Please refer to FIG. 2, which is a schematic diagram flowchart of a method for pushing track information provided in the embodiments of the present invention, and as shown in the figure, the method comprises the steps as follows:

S201, a key word sent by a client is received.

Specifically, the client obtains a key word input by a user, and then sends the key word to a server; in this way, the server can receive the key word sent by the client.

Preferably, the key word can comprise at least two points of interest (POIs), for example, the key word can be "the Great Wall the Palace Museum"; in this way, the key word comprises two points of interest of "the Great Wall" and "the Palace Museum". Alternatively, the key word can be a key word of a universal requirement type, and the key word of a universal requirement type can indicate the requirement of the user. For example, the key word can be "Wudaokou (五道口) entertainment", and this key word indicates that the requirement of the user is not a certain precise point of interest, but a certain type of point of interest or track; and "Wudaokou entertainment" indicates that the requirement of the user is entertainment in the area of Wudaokou, such as KTV, a cinema, an arcade, etc.

S202, recommended track information which matches the key word is obtained according to historical track information, wherein the historical track information comprises historical track information about a terminal where the client is located and historical track information about terminal(s) other than the terminal where the client is located.

Specifically, after receiving the key word sent by the client, the server can obtain the recommended track information which matches the key word according to the historical track information. In the embodiments of the present invention, the historical track information can comprise historical track information about a terminal where the client is located and historical track information about terminal(s) other than the terminal where the client is located.

By way of example, the methods for a server to obtain recommended track information which matches the key word according to the historical track information can be comprised of the following two types:

The first type: if the key word comprises at least two points of interest, the server should plan a reasonable track according to the at least two points of interest, and obtain a travel plan between the at least two points of interest; therefore, the server should first obtain historical track information corresponding to each of the points of interest in the at least two points of interest according to each of the points of interest in the at least two points of interest and according to a corresponding relationship between the points of interest and the historical track information. After that, the server obtains historical track information simultaneously containing the at least two points of interest according to the historical track information corresponding to each of the points of interest, and takes the historical track information simultaneously containing the at least two points of interest as the recommended track information.

For example, if the key word contains three points of interest, i.e. point 1 of interest, point 2 of interest and point 3 of interest, the server carries out retrieval in the corresponding relationship between the points of interest and the historical track information according to point 1 of interest, point 2 of interest and point 3 of interest, and respectively obtains matched historical track information; then, according to the historical track information which respectively matches the three points of interest, obtains the same historical track information therein; thus the historical track information will simultaneously contain the three points of interest.

In another example, the historical track information containing the three points of interest can be various types of historical track information, such as "point 1 of interest→point 2 of interest→point 3 of interest", "point 1 of interest→point 2 of interest→point 3 of interest→point 4 of interest→point 5 of interest", "point 1 of interest→point 3 of interest→point 4 of interest→point 2 of interest→point 5 of interest" or "point 1 of interest→point 4 of interest→point 2 of interest→point 5 of interest→point 3 of interest", etc., as long as the historical track information simultaneously contains point 1 of interest, point 2 of interest and point 3 of interest; and the sequence of the three points of interest is not considered, and whether there is another point of interest between the three points of interest is not considered either.

The second type: if the key word is a key word of a universal requirement type, this key word expresses the requirement of the user, and does not precisely contain recommended track information about a certain point of interest; therefore, when the key word is a key word of a universal requirement type, the server does not directly match the key word, but first identifies the requirement of the user using the client according to the key word, so as to obtain a track type of the requirement of the user using the client. After that, the server obtains the historical track information corresponding to the track type of the requirement of the user using the client according to the obtained track type and a corresponding relationship between the track type and the historical track information. Finally, the server selects a part of the historical track information or all of the historical track information from the historical track information corresponding to the track type, to serve as the recommended track information which matches the key word.

The server can use a semantic analysis model to perform semantic analysis on the key word obtained by the server, so as to analyze the track type of the requirement of the user using the client. Alternatively, the server uses a preset word segmentation dictionary to perform word segmentation processing on the key word, so as to obtain at least one segmented word, then uses a preset universal requirement retrieval term list to identify the at least one segmented word, so as to identify the track type of the requirement of the user using the client. For example, the universal requirement retrieval term list can comprise at least one track type, and at least one word corresponding to each track type.

For example, if the input key word is "Wudaokou entertainment", the segmented words "Wudaokou" and "entertainment" are obtained after word segmentation processing; and then after the identification of the requirement of the user using the client, the obtained track type can be "Wudaokou-leisure track".

The method for the server to select a part of the historical track information from the historical track information corresponding to the track type can comprise: the server ranking the obtained historical track information according to weight values of the historical track information, and then selecting several pieces of historical track information which rank top. The weight value of the historical track information can be determined according to at least one of: the occurrence frequency, update time and the degree of matching with the key word of the historical track information.

It should be noted that, in the above two methods, before obtaining the historical track information, the server should first obtain the corresponding relationship between the track type and the historical track information or the corresponding relationship between the points of interest and the historical track information.

By way of example, in the embodiments of the present invention, the method for the server to obtain the corresponding relationship between the track type and the historical track information or the corresponding relationship between the point of interest and the historical track information can comprise:

first of all, the server obtains, according to at least one preset scenario type and historical track information about a large number of terminals obtained in advance, K pieces of historical track information corresponding to each of the scenario type(s) of the at least one scenario types, K being an integer greater than or equal to 1.

For example, if it is required to realize the planning of a trip route, and the corresponding scenario type is a trip track, then the server selects, in the large amount of historical track information, historical track information which contains a point of interest of a scenic spot type, or historical track information which contains a point of a scenic spot and hotel type.

In another example, if it is required to realize the planning of a weekend leisure trip, and the corresponding scenario type is a leisure track, then the server selects, in a large amount of historical track information, historical track information which contains a point of interest of a catering and/or entertainment type, such as historical track information containing a cinema, KTV or a restaurant.

The historical track information can comprise historical track information about a terminal where the client is located and historical track information about terminal(s) other than the terminal where the client is located.

Each piece of historical track information can comprise at least two points of interest and the sequence of the terminal stopping on the at least two points of interest, and can also comprise the moment when the terminal stops on each of the points of interest and/or the duration of the terminal stopping on each of the points of interest.

For example, the historical track information can be "point 1 of interest→point 2 of interest→point 3 of interest", which indicates that the terminal stops at point 1 of interest first, then goes to point 2 of interest from point 1 of interest and stops on point 2 of interest, and then goes to point 3 of interest from point 2 of interest and stops on point 3 of interest.

The method for the server to obtain historical track information about a large number of terminals in advance may be: the server can perform aggregation processing on positioning data of each terminal according to a large amount of positioning data, the identifier of the terminal and the positioning moment, so as to obtain at least one movement track of each terminal. After that, the server performs identification processing on stopping positions on each movement track in the at least one movement track of each terminal, so as to obtain the movement track which contains the stopping positions. For the movement track which contains the stopping positions, the server obtains the point of interest corresponding to each stop position, and obtains the historical track information about the terminal according to the movement track and the points of interest in the movement track. The server can store the obtained historical track information about each terminal in the large number of terminals, and can directly use the stored historical track information when there is a need to use the historical track information.

After that, the server performs, according to at least one geographical position and K pieces of historical track information corresponding to each of the scenario type(s) obtained above, classification processing on the K pieces of historical track information corresponding to each of the scenario type(s), so as to obtain P pieces of historical track information corresponding to each of the geographical positions, P being an integer which is greater than or equal to 1 and smaller than or equal to K; in this way, the server can obtain the historical track information corresponding to each geographical position in the at least one geographical position under each of the scenario type(s).

For example, classification processing can be performed, with cities as units, on the historical track information, the scenario type of which is a trip track, so as to obtain the historical track information corresponding to the trip track type of each city.

In another example, weekend leisure activities of the user are usually near business areas; therefore, classification processing can be performed in units of business area on the historical track information, the scenario type of which is a leisure track, so as to obtain the historical track information corresponding to the leisure track type of each business area.

Next, for P pieces of historical track information corresponding to each geographical position of the at least one geographical position under each of the scenario type(s), the server obtains the weight value of each piece of historical track information of the P pieces of historical track information. The server can obtain the weight value of the historical track information according to at least one piece of information of: the occurrence frequency, update time and the degree of matching with the key word of the historical track information.

After obtaining the weight value of each piece of historical track information of the P pieces of historical track information, the server can obtain, according to the weight value and a preset weight threshold $\theta_1$, R pieces of historical track information of the P pieces of historical track information, the weight values of the R pieces of historical track information being greater than or equal to the weight threshold $\theta_1$. Alternatively, the server ranks the P pieces of historical track information according to the descending order of the weight values, and according to the ranking result, obtains R pieces of historical track information with the maximum weight values of the P pieces of historical track information, R being an integer which is greater than or equal to 1 and smaller than or equal to P.

It should be noted that the purpose of obtaining the historical track information with a larger weight value is to excavate valuable and high-quality historical track information from a large amount of historical track information; in this way, the user requirement can be satisfied only if the historical track information is recommended to the user as recommended track information; and the historical track information, the occurrence frequency of which is small, can not be recommended to the user as high-quality recommended track information because it is not common enough.

Finally, the server obtains at least one track type according to at least one scenario type and at least one geographical position, and obtains the corresponding relationship between the track type and the historical track information according to the at least one track type and the R pieces of historical track information.

For example, according to the scenario type of "trip track" and the geographical positions of "Beijing" and "Xi'an", the track types of "Beijing-trip track" and "Xi'an-trip track" can be obtained.

In another example, according to the scenario type "leisure track" and the geographical positions of "Wudaokou" and "Xidan", track types of "Wudaokou-leisure track" and "Xidan-leisure track" can be obtained.

Alternatively, the server obtains at least one point of interest contained in each piece of historical track information according to the R pieces of historical track information; then the server performs repetition exclusion processing on the points of interest according to the at least one point of interest contained in each piece of historical track information, so as to obtain a set of points of interest; finally, the server obtains the corresponding relationship between the points of interest and the historical track information according to each of the points of interest in the set of points of interest and the obtained R pieces of historical track information. The historical track information corresponding to the points of interest refers to the historical track information containing the points of interest. In addition, each of the points of interest can correspond to at least one piece of historical track information.

The server can locally store the obtained corresponding relationship between the track type and the historical track information and/or the corresponding relationship between the points of interest and the historical track information.

The server can also repeatedly carry out, according to a preset period, the above process of obtaining the corresponding relationship between the track type and the historical track information and/or the corresponding relationship between the point of interest and the historical track information, so as to realize the regular updating of the corresponding relationships.

S203, the recommended track information is pushed to the client.

Specifically, after obtaining the recommended track information, the server can obtain the weight value of the recommended track information according to at least one piece of information of: the occurrence frequency, update time and the degree of matching with the key word of the recommended track information. After that, the server ranks the recommended track information according to the descending order of the weight values, so as to obtain a ranking result, and finally, the server pushes the ranking result to the client. After receiving the ranking result from the server, the client can display the ranking result; in this way, the user can see the recommended track information pushed by the server.

In addition, the server can also perform further screening on the ranking result and/or re-rank the ranking result, according to a key word further input by the user, for example, the number of travel days, the price, etc.

The embodiments of the present invention further provide an apparatus embodiment for implementing each step and method in the above-mentioned method embodiment.

Figure 3:
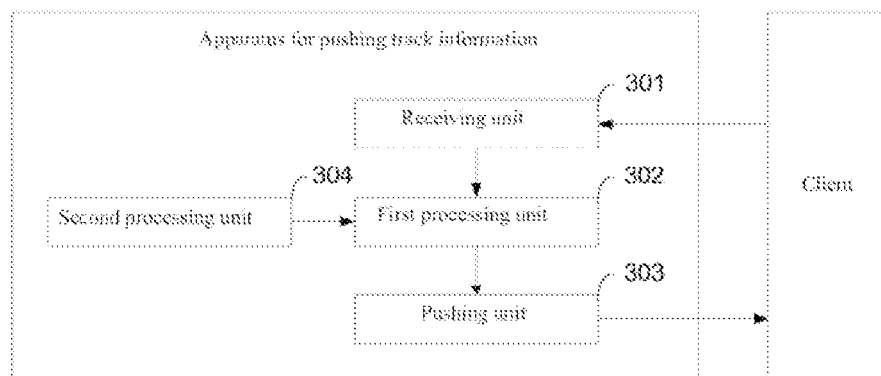
FIG. 3 is a functional block diagram of an apparatus for pushing track information provided in the embodiments of the present invention.

Please refer to FIG. 3, which is a functional block diagram of an apparatus for pushing track information provided in the embodiments of the present invention. As shown in the figure, the apparatus comprises:

a receiving unit 301 for receiving a key word sent by a client;

a first processing unit 302 for obtaining, according to historical track information, recommended track information which matches the key word, wherein the historical track information comprises historical track information about a terminal where the client is located and historical track information about terminal(s) other than the terminal where the client is located; and a pushing unit 303 for pushing the recommended track information to the client.

Preferably, the key word comprises at least two points of interest, and the first processing unit 302 is specifically used for:

obtaining, according to a corresponding relationship between the points of interest and the historical track information, historical track information corresponding to each of the points of interest of the at least two points of interest; and obtaining, according to the historical track information corresponding to each of the points of interest, historical track information simultaneously containing the at least two points of interest, and taking the historical track information simultaneously containing the at least two points of interest as the recommended track information.

Preferably, the key word is a key word of a universal requirement type, and the first processing unit 302 is specifically used for:

obtaining, according to the key word, a track type of a requirement of a user using the client;

obtaining, according to a corresponding relationship between the track type and the historical track information, historical track information corresponding to the track type; and selecting a part of the historical track information or all of the historical track information from the historical track information corresponding to the track type, to serve as the recommended track information which matches the key word.

Optionally, the apparatus further comprises:

a second processing unit 304 for obtaining K pieces of historical track information corresponding to each of the scenario type(s) of at least one scenario type, K being an integer greater than or equal to 1; performing, according to at least one geographical position, classification processing on the K pieces of historical track information corresponding to each of the scenario type(s), so as to obtain P pieces of historical track information corresponding to each of the geographical positions, P being an integer which is greater than or equal to 1 and smaller than or equal to K; obtaining a weight value of each piece of historical track information of the P pieces of historical track information; obtaining, according to the weight value and a preset weight threshold, R pieces of historical track information of the P pieces of historical track information; or obtaining R pieces of historical track information with the maximum weight values of the P pieces of historical track information, R being an integer which is greater than or equal to 1 and smaller than or equal to P; and obtaining at least one track type according to the at least one scenario type and the at least one geographical position, and obtaining, according to the at least one track type and the R pieces of historical track information, a corresponding relationship between the track type and the historical track information; or, obtaining, according to the R pieces of historical track information, at least one point of interest, and obtaining, according to each of the points of interest and the R pieces of historical track information, a corresponding relationship between the points of interest and the historical track information.

Preferably, the pushing unit 303 is specifically used for:

acquiring weight values of the recommended track information;

ranking, in accordance with the descending order of the weight values, the recommended track information, so as to obtain a ranking result; and pushing the ranking result to the client.

Figure 2:
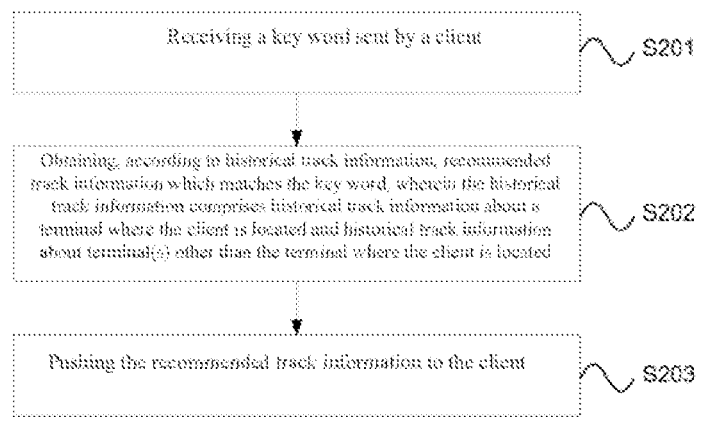
FIG. 2 is a schematic flowchart of a method for pushing track information provided in the embodiments of the present invention.

Since various units in this embodiments can execute the method shown in FIG. 2, for the parts not described in detail in this embodiment, reference can be made to the relevant explanation about FIG. 2.

The technical solutions of the embodiments of the present invention have the following beneficial effects:

In the embodiments of the present invention, according to a key word input on a client, retrieval is performed in historical track information in a large amount of terminals, so as to obtain recommended track information which matches the key word; therefore, the obtained recommended track information is real track information; compared with the track planned using the shortest path algorithm in the prior art, the track information recommended in the technical solution provided in the embodiments of the present invention can satisfy the requirements of users, thus being able to improve the quality of the pushed track information, and to improve the reliability of the pushed track information.

Those of ordinary skill in the art may clearly understand that, for the convenience and brevity of description, the specific operation processes of the above systems, apparatuses and units may refer to the corresponding processes in the method embodiments, which will not be described here.

In a few embodiments provided in the present invention, it shall be understood that the disclosed system, apparatus and method may be implemented in other manners. For example, the apparatus embodiments described above are merely illustrative. For example, the division of the units is merely a logical function division, and there may be other division manners during actual implementation. For example, a plurality of units or components may be combined or may be integrated into another system, or some features may be omitted, or not executed. In another point, the shown or discussed coupling or direct coupling or communication connection therebetween may be an indirect coupling or a communication connection via some interfaces, apparatuses or units, and may be electrical, mechanical, or in other forms.

The units described as separate components may or may not be physically separated, and components displayed as units may or may not be physical units, that is, they may be located in one position, or may also be distributed on a plurality of network elements. Some or all of the units may be selected according to actual needs to achieve the objectives of the solutions of the present embodiments.

In addition, various functional units in various embodiments of the present invention may be integrated into one processing unit, or each of the units may also exist alone physically, or two or more units may also be integrated into one unit. The integrated unit above may be implemented in the form of hardware or may also be implemented in the form of hardware with functional software units.

The integrated unit implemented by functional software units may be stored in a computer readable storage medium. The functional software units are stored in a storage medium and include several instructions for enabling a computer apparatus (which can be a personal computer, a server, or a network apparatus and so on) or a processor to execute some steps of the method described in the embodiments of the present invention. The foregoing storage medium comprises: various media that may store program codes, such as a U-disk, a removable hard disk, a read-only memory (ROM), a random access memory (RAM), a magnetic disk, or an optical disk.

The foregoing are merely preferred embodiments of the present invention, but are not intended to limit the present invention. Any modifications, equivalent replacements, or improvements made without departing from the spirit and principle of the present invention shall fall within the scope of protection of the present invention.

What is claimed is:

1. A method for pushing track information, comprising:

obtaining recommended track information matching a received key word according to historical track information; and pushing the recommended track information to a client, wherein the received key word comprises at least two points of interest.

2. The method of claim 1, further comprising receiving the received key word from a client, wherein the historical track information comprises historical track information about a client terminal where the client is located and historical track information about at least one other terminal other than the client terminal.

3. The method of claim 1, wherein said obtaining comprises:

obtaining, according to a corresponding relationship between the at least two points of interest and the historical track information, historical track information corresponding to each of the at least two points of interest;

obtaining, according to the historical track information corresponding to each of the at least two points of interest, historical track information simultaneously including the at least two points of interest; and taking the historical track information simultaneously including the at least two points of interest as the recommended track information.

4. The method of claim 2, wherein the received key word is a key word of a universal requirement type.

5. The method of claim 4, wherein said obtaining comprises:

obtaining, according to the received key word, a track type of a requirement of a user using the client;

obtaining, according to a corresponding relationship between the track type and the historical track information, historical track information corresponding to the track type; and selecting a least a portion of the historical track information corresponding to the track type to serve as the recommended track information that matches the key word.

6. The method of claim 5, wherein said selecting a least the portion of the historical track information comprises selecting all of the historical track information.

7. The method of claim 5, further comprising:

obtaining K pieces of the historical track information corresponding to each of at least one scenario type, K being an integer greater than or equal to one;

performing, according to at least one geographical position, classification processing on the K pieces of the historical track information corresponding to each of the at least one scenario type so as to obtain P pieces of the historical track information corresponding to each of the at least one geographical position, P being an integer that is greater than or equal to one and smaller than or equal to K;

obtaining a weight value of each of the P pieces of the historical track information;

obtaining, according to the weight value and a preset weight threshold, R pieces of the historical track information of the P pieces of the historical track information, R being an integer which is greater than or equal to one and smaller than or equal to P;

obtaining, according to the at least one scenario type and the at least one geographical position, at least one track type; and obtaining, according to the at least one track type and the R pieces of the historical track information, a corresponding relationship between the track type and the historical track information.

8. The method of claim 5, further comprising:

obtaining K pieces of the historical track information corresponding to each of at least one scenario type, K being an integer greater than or equal to one;

performing, according to at least one geographical position, classification processing on the K pieces of the historical track information corresponding to each of the at least one scenario type so as to obtain P pieces of the historical track information corresponding to each of the at least one geographical position, P being an integer that is greater than or equal to one and smaller than or equal to K;

obtaining a weight value of each of the P pieces of the historical track information;

obtaining R pieces of the historical track information with maximum weight values of the P pieces of the historical track information, R being an integer which is greater than or equal to one and smaller than or equal to P;

obtaining, according to the R pieces of the historical track information, at least one point of interest; and obtaining, according to each of the points of interest and the R pieces of the historical track information, a corresponding relationship between the points of interest and the historical track information.

9. The method of claim 1, wherein said pushing comprises:

acquiring weight values of the recommended track information;

ranking, in accordance with a descending order of the weight values, the recommended track information to obtain a ranking result; and pushing the ranking result.

10. An apparatus for pushing track information, comprising:

a receiving unit configured to receive a key word sent by a client;

a first processing unit configured to obtain, according to historical track information, recommended track information that matches the key word, wherein the historical track information comprises historical track information about a terminal where the client is located and historical track information about at least one other terminal other than the terminal where the client is located; and a pushing unit configured to push the recommended track information to the client, wherein the received key word comprises at least two points of interest.

11. The apparatus of claim 10, wherein said first processing unit is configured to:

obtain, according to a corresponding relationship between the points of interest and the historical track information, historical track information corresponding to each of the points of interest of the at least two points of interest; and obtain, according to the historical track information corresponding to each of the points of interest, historical track information simultaneously containing the at least two points of interest, and taking the historical track information simultaneously containing the at least two points of interest as the recommended track information.

12. The apparatus of claim 10, wherein the key word is associated with a universal requirement type, and wherein said first processing unit is configured to:

obtain, according to the key word, a track type of a requirement of a user using the client;

obtain, according to a corresponding relationship between the track type and the historical track information, historical track information corresponding to the track type; and select at least a part of the historical track information from the historical track information corresponding to the track type to serve as the recommended track information which matches the key word.

13. The apparatus of claim 12, further comprising a second processing unit to:

obtain K pieces of the historical track information corresponding to each of at least one scenario type, K being an integer greater than or equal to one;

perform, according to at least one geographical position, classification processing on the K pieces of the historical track information corresponding to each of the at least one scenario type so as to obtain P pieces of the historical track information corresponding to each of the at least one geographical position, P being an integer that is greater than or equal to one and smaller than or equal to K;

obtain a weight value of each of the P pieces of the historical track information;

obtain, according to the weight value and a preset weight threshold, R pieces of the historical track information of the P pieces of the historical track information, R being an integer which is greater than or equal to one and smaller than or equal to P;

obtain, according to the at least one scenario type and the at least one geographical position, at least one track type; and obtain, according to the at least one track type and the R pieces of the historical track information, a corresponding relationship between the track type and the historical track information.

14. The apparatus of claim 12, further comprising a second processing unit configured to:

obtain K pieces of the historical track information corresponding to each of at least one scenario type, K being an integer greater than or equal to one;

perform, according to at least one geographical position, classification processing on the K pieces of the historical track information corresponding to each of the at least one scenario type so as to obtain P pieces of the historical track information corresponding to each of the at least one geographical position, P being an integer that is greater than or equal to one and smaller than or equal to K;

obtain a weight value of each of the P pieces of the historical track information;

obtain R pieces of the historical track information with maximum weight values of the P pieces of the historical track information, R being an integer which is greater than or equal to one and smaller than or equal to P;

obtain, according to the R pieces of the historical track information, at least one point of interest; and obtain, according to each of the points of interest and the R pieces of the historical track information, a corresponding relationship between the points of interest and the historical track information.

15. The apparatus of claim 10, wherein said pushing unit is configured to:

acquire weight values of the recommended track information;

rank, in accordance with a descending order of the weight values, the recommended track information to obtain a ranking result; and push the ranking result.

16. A non-transitory computer storage medium including at least one program for pushing track information when implemented by a processor, comprising:

instruction for obtaining recommended track information matching a received key word according to historical track information; and instruction for pushing the recommended track information to a client, wherein the received key word comprises at least two points of interest.

17. The non-transitory computer storage medium of claim 16, further comprising instruction for receiving the received key word from a client, wherein the historical track information comprises historical track information about a client terminal where the client is located and historical track information about at least one other terminal other than the client terminal.

18. The non-transitory computer storage medium of claim 16, wherein said instruction for obtaining comprises:

instruction for obtaining, according to a corresponding relationship between the at least two points of interest and the historical track information, historical track information corresponding to each of the at least two points of interest;

instruction for obtaining, according to the historical track information corresponding to each of the at least two points of interest, historical track information simultaneously including the at least two points of interest; and instruction for taking the historical track information simultaneously including the at least two points of interest as the recommended track information.

\* \* \* \* \*